US011297267B2

(12) United States Patent
Matsumiya

(10) Patent No.: US 11,297,267 B2
(45) Date of Patent: Apr. 5, 2022

(54) CONTROL CIRCUIT AND CONTROL METHOD FOR INFRARED DETECTOR, AND IMAGING DEVICE

(71) Applicant: FUJITSU LIMITED, Kawasaki (JP)

(72) Inventor: Yasuo Matsumiya, Hadano (JP)

(73) Assignee: FUJITSU LIMITED, Kawasaki (JP)

(*) Notice: Subject to any disclaimer, the term of this patent is extended or adjusted under 35 U.S.C. 154(b) by 31 days.

(21) Appl. No.: 16/456,928

(22) Filed: Jun. 28, 2019

(65) Prior Publication Data
US 2020/0018653 A1 Jan. 16, 2020

(30) Foreign Application Priority Data

Jul. 10, 2018 (JP) .............................. JP2018-130803

(51) Int. Cl.
H04N 5/355 (2011.01)
G01J 5/22 (2006.01)
G01J 1/44 (2006.01)
H04N 5/33 (2006.01)
H04N 5/376 (2011.01)
H04N 5/353 (2011.01)

(52) U.S. Cl.
CPC ............... H04N 5/355 (2013.01); G01J 1/44 (2013.01); G01J 5/22 (2013.01); H04N 5/33 (2013.01); H04N 5/3535 (2013.01); H04N 5/35527 (2013.01); H04N 5/35563 (2013.01); H04N 5/376 (2013.01); G01J 2001/4406 (2013.01)

(58) Field of Classification Search
None
See application file for complete search history.

(56) References Cited

U.S. PATENT DOCUMENTS

| 2002/0195563 | A1* | 12/2002 | Iida | H01L 27/14634 250/332 |
| 2006/0181627 | A1* | 8/2006 | Farrier | H04N 5/35545 348/308 |
| 2007/0145274 | A1* | 6/2007 | Iida | G01J 5/24 250/338.4 |
| 2008/0099679 | A1 | 5/2008 | Takemura et al. | |
| 2013/0242152 | A1* | 9/2013 | Kasai | H04N 5/35554 348/294 |
| 2016/0185283 | A1* | 6/2016 | Weiner | B60Q 1/44 340/469 |

FOREIGN PATENT DOCUMENTS

| CN | 108895925 A | * 11/2018 | ............. F42B 15/01 |
| JP | 09-083870 | 3/1997 | |
| JP | 2008-064655 | 3/2008 | |
| JP | 2008-111754 | 5/2008 | |

* cited by examiner

Primary Examiner — Cynthia Segura
(74) Attorney, Agent, or Firm — Fujitsu Patent Center

(57) ABSTRACT

A control method of an infrared detector, for obtaining a wider dynamic range and preventing an over-range, is disclosed. The method includes: monitoring a value acquired in response to an electric current flowing in each of a plurality of infrared detection elements configuring the infrared detector, and lowering, when the value acquired in response to the electric current flowing in the infrared detection element reaches a threshold value within a detection time, sensitivity of the infrared detection element within the detection time.

15 Claims, 11 Drawing Sheets

CONTROL CIRCUIT AND CONTROL METHOD FOR INFRARED DETECTOR, AND IMAGING DEVICE

CROSS-REFERENCE TO RELATED APPLICATION

This application is based upon and claims the benefit of priority of the prior Japanese Patent Application No. 2018-130803, filed on Jul. 10, 2018, the entire contents of which are incorporated herein by reference.

FIELD

The embodiment discussed herein is related to a control circuit and a control method for an infrared detector, and an imaging device.

BACKGROUND

For an imaging device including a plurality of infrared detection elements, various methods have been proposed in order to reduce a decrease in dynamic range, or in order to expand a dynamic range.

For example, a method has been known in which after outputs are read from all the infrared detection elements in one frame, the outputs are determined by using a threshold value, all the infrared detection elements are collectively controlled in the following frame in response to the determination result, and thus the decrease in dynamic range is reduced.

For example, a method has also been known in which after images of a plurality of frames are consecutively acquired in different photosensitive times, these images are synthesized, and thus a dynamic range of the output image is expanded.

For example, a method has also been known in which a low sensitivity pixel and a high sensitivity pixel are provided, information is acquired from each of the low sensitivity pixel and the high sensitivity pixel in one frame, and when imaging is performed, in a case where a signal from the high sensitivity pixel is saturated, only a signal from the low sensitivity pixel is used. Japanese Laid-open Patent Publication No. 9-83870, Japanese Laid-open Patent Publication No. 2008-64655, and Japanese Laid-open Patent Publication No. 2008-111754 are examples of related art.

SUMMARY

According to an aspect of the embodiments, a control method of an infrared detector, for obtaining a wider dynamic range and preventing an over-range, is disclosed. The method includes: monitoring a value acquired in response to an electric current flowing in each of a plurality of infrared detection elements configuring the infrared detector, and lowering, when the value acquired in response to the electric current flowing in the infrared detection element reaches a threshold value within a detection time, sensitivity of the infrared detection element within the detection time.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In an imaging device, a narrow dynamic range of an infrared detection element causes occurrence of a region where over-range occurs, and information of the region may not be acquired.

However, in the known imaging device, even in a case where a dynamic range is expandable, a frame rate or the number of elements (the number of pixels) is sacrificed.

An object of an embodiment is to expand a dynamic range of an infrared detection element without sacrificing a frame rate or the number of the infrared detection elements (the number of pixels).

Hereinafter, a control circuit and a control method for an infrared detector, and an imaging device according to the embodiment of the present disclosure will be described with reference to FIG. 1 to FIG. 11. The imaging device according to the embodiment is an infrared imaging device, and includes an infrared detector 1 including a plurality of infrared detection elements and a control circuit 2 configured to control the infrared detector 1 as illustrated in FIG. 10. An example control circuit 2 may be a driving circuit 15 detailed later (shown in FIG. 1 as 15, 2).

An imaging device is also referred to as an imaging element. A control circuit is also referred to as a control circuit for an infrared detector. In the infrared detector 1, infrared detection elements configured to convert infrared ray from an object (target to be imaged) into an electric signal are one-dimensionally or two-dimensionally (two-dimensionally in FIG. 10) arranged. In this case, in the infrared detector 1, a plurality of infrared detection elements is two-dimensionally arranged and is an infrared detection element array in which the infrared detection elements configure respective pixels.

The infrared detection element is an infrared detection element configured to generate a photocurrent in response to an incident quantity of infrared ray, and is, for example, an infrared detection element, such as a quantum well infrared photodetector (QWIP), or a quantum dot infrared photodetector (QDIP), in which an electric resistance changes in response to an incident quantity of infrared ray. The infrared detector 1 is also referred to as an infrared detector or an infrared detection unit. The infrared detection element array is also referred to as a sensor array, a sensor element array, a photoelectric conversion element array, an infrared focal plane array (IRFPA), a QWIP focal plane array (QWIP-FPA), or a QDIP focal plane array (QDIP-FPA). The infrared detection element is also referred to as an infrared photodetector, a quantum type infrared detection element, a photosensitive element, a light receiving element, a sensor element, a QWIP element, or a QDIP element.

Figure 11:
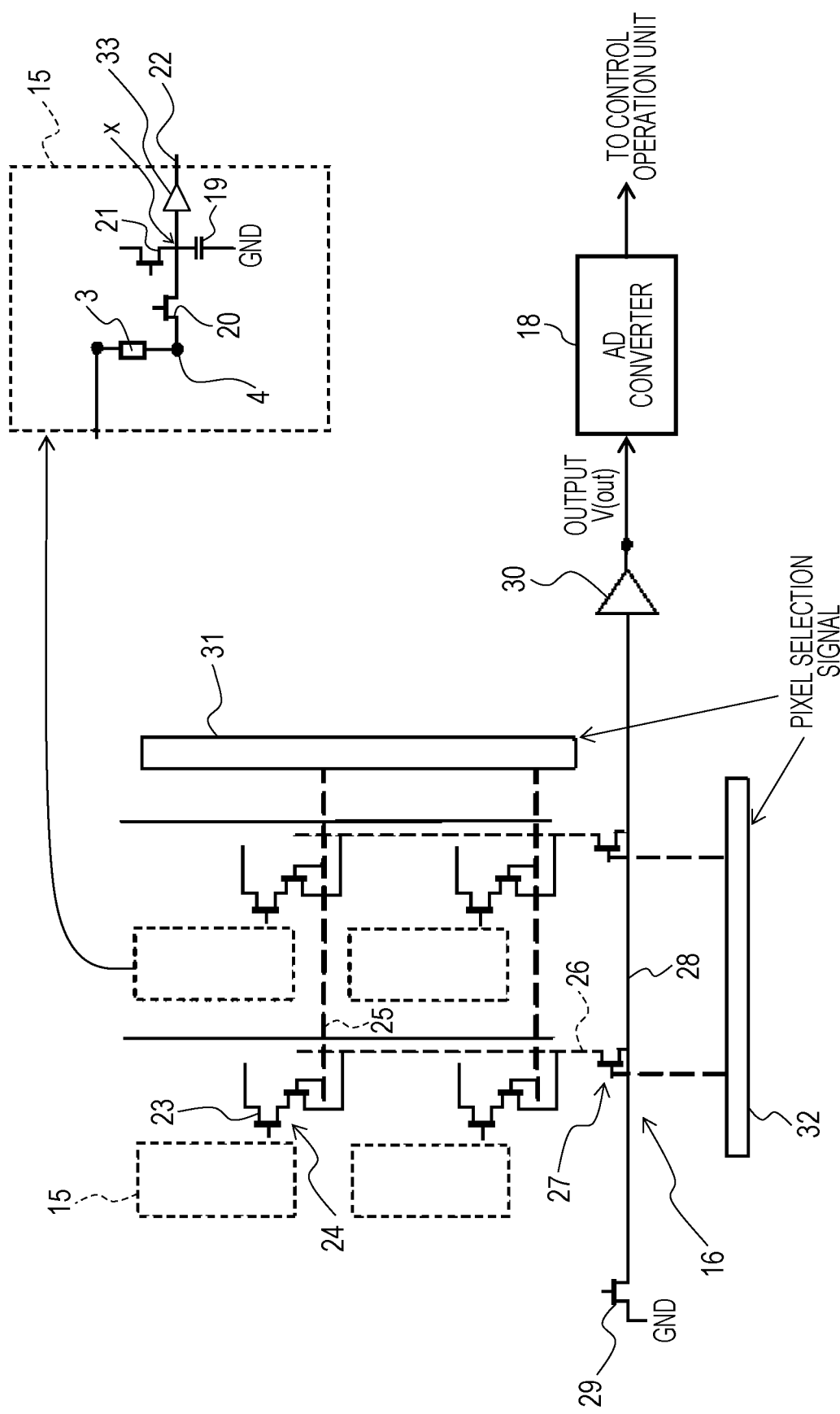
FIG. 11 is a diagram illustrating a configuration of the control circuit for the infrared detector according to the embodiment.

As illustrated in FIG. 11, the control circuit 2 is coupled to each of a plurality of infrared detection elements 3, and includes a plurality of driving circuits 15 (portions other than the infrared detection element 3 in a dotted frame) configured to drive the corresponding plurality of infrared detection elements 3, and a switching circuit 16 for sequentially reading an output of each driving circuit 15, that is, an output voltage of each driving circuit 15 in response to an amount of an electric current that flows through each infrared detection element 3 when infrared ray enters. In other words, for example, the driving circuit 15 is provided for each infrared detection element, namely, each pixel, and is configured to sequentially read an output of each pixel (pixel output) by using the switching circuit 16.

As illustrated in FIG. 10, the control circuit 2 is provided in a readout circuit chip 5 coupled to the infrared detection element array 1 with conductive metal bump electrodes 4 (in this case, In bump electrodes) interposed therebetween. That is, for example, the readout circuit chip 5 and the infrared detection element array 1 are bonded by flip chip bonding. In this case, an AD converter 18 is further integrated in the readout circuit chip 5 (for example, refer to FIG. 11). The AD converter 18 may not be integrated in the readout circuit chip 5.

The readout circuit chip 5 is also referred to as a readout integrated circuit (ROIC) chip, a readout circuit array, a control circuit chip, an integrated circuit chip, or a signal processing circuit chip. The control circuit 2 is also referred to as a readout circuit or ROIC. The switching circuit 16 is also referred to as a readout circuit, a signal processing circuit, or a signal processing unit. In this case, the plurality of the driving circuits 15 is coupled to the corresponding plurality of the infrared detection elements 3 configuring the infrared detector 1 via the bump electrodes 4.

Each driving circuit 15 is a driving circuit configured to drive the infrared detection element 3 under certain conditions, and an electric current flows into each driving circuit 15 in response to an infrared ray quantity incident on each infrared detection element 3. Each driving circuit 15 includes an integral circuit configured to integrate an electric current flowing in each infrared detection element 3 in response to an infrared ray incident with respect to time by an integral capacitor 19, to convert the integrated electric current into a voltage, and to output the voltage.

That is, for example, each driving circuit 15 is configured to integrate the electric current flowing in each infrared detection element 3 by the integral capacitor 19 for each frame (specifically, for example, for each detection time), and to output change in voltage of the integral capacitor 19 as an output of each pixel through an output amplifier 33. In this case, each driving circuit 15 includes a capacitor 19 (integral capacitor), a switch 20 (transistor) for connecting the capacitor 19 to the infrared detection element 3, a switch 21 (transistor) for connecting the capacitor 19 to a bias power source, and the output amplifier 33.

In other words, for example, each driving circuit 15 includes the switch 20 coupled to one side of the infrared detection element 3 (for example, one side of the QDIP or QWIP) via the bump electrode 4, the switch 21 coupled to the bias power source, and the capacitor 19 coupled to these switches 20 and 21. An output terminal 22 is coupled to a contact X at which respective terminals of the capacitor 19, and the switches 20 and 21 are coupled, via the output amplifier 33.

The bump electrode 4 as a common electrode is coupled to the other side of the infrared detection element 3 (for example, the other side of the QDIP or QWIP). The switching circuit 16 is coupled to the output terminal 22 of each driving circuit 15. That is, for example, the switching circuit 16 includes a plurality of source follower transistors 23, a plurality of row selection transistors 24, a plurality of row lines 25, a plurality of column lines 26, a plurality of column selection transistors 27, a readout line 28, a load transistor 29, an amplifier 30, a vertical scanning shift register 31, and a horizontal scanning shift register 32.

The output terminal 22 of each driving circuit 15 is coupled to a gate terminal of each source follower transistor 23. The column line 26 and the readout line 28 are also referred to as an output line. The amplifier 30 is also referred to as a final output stage amplifier, output amplifier, voltage buffer, DC amplifier, or impedance conversion circuit. The row selection transistor 24 is also referred to as a vertical selection switch. The column selection transistor 27 is also referred to as a horizontal selection switch.

Since the gate terminal of the source follower transistor 23 is coupled to the output terminal 22 of the driving circuit 15, the source follower transistor 23 is configured to operate in response to an output of the driving circuit 15. A drain terminal of each source follower transistor 23 is coupled to a power supply (not illustrated), and a power supply voltage is supplied to the drain terminal. Each row selection transistor 24 is coupled to each of source terminals of the plurality of source follower transistors 23.

Each row line 25 is coupled to gate terminals of the row selection transistors 24 in each row. Each column line 26 is coupled to the source follower transistors 23 via the row selection transistors 24. In other word, for example, each column line 26 is coupled to the source follower transistors 23 in each column via the row selection transistors 24.

Each column selection transistor 27 is coupled to each of the plurality of column lines 26. The readout line 28 is coupled to all the column selection transistors 27. The vertical scanning shift register 31 is coupled to all the row lines 25, and is configured to sequentially drive the respective row lines 25, and to control conduction or nonconduction of the row selection transistors 24 that are coupled to each row line 25.

The horizontal scanning shift register 32 is coupled to all the column selection transistor 27, and is configured to sequentially drive the respective column selection transistors 27, and to control conduction or nonconduction of each column selection transistor 27. One side of the readout line 28 is coupled to an output terminal $V_{OUT}$ via the amplifier 30, and the other side of the readout line 28 is coupled to a ground potential (GND) via the load transistor 29.

When a selection signal of a pixel from a control operation unit (not illustrated) is input, and one row line 25 is selected by the vertical scanning shift register 31, the row selection transistors 24 coupled to the selected row line 25 become a conductive state (on-state). When the row selection transistors 24 become the conductive state, an output signal from each infrared detection element 3 is output to the column line 26 via the driving circuit 15, the source follower transistor 23, and the row selection transistor 24.

On the other hand, when a selection signal of a pixel from the control operation unit (not illustrated) is input, and one column selection transistor 27 is selected by the horizontal scanning shift register 32, the selected column selection transistor 27 become a conductive state (on-state). When the column selection transistor 27 become the conductive state, an output signal output to each column line 26 as described above is output to the readout line 28 via the column selection transistor 27. The output signal output to the readout line 28 is output to the output terminal $V_{OUT}$ via the amplifier 30.

In this embodiment, the AD converter 18 is coupled to the output terminal $V_{OUT}$ of the switching circuit 16, an analog electric signal that is an output signal from the switching circuit 16 is converted into a digital electric signal, and the digital electric signal is output from the readout circuit chip 5 to the control operation unit. The output signal from the readout circuit chip 5 is sent to the control operation unit and is subjected to signal processing by the control operation unit.

The control operation unit is configured with a computer or a controller. The control operation unit is configured to output electric power, a driving pulse, or the like for driving the respective infrared detection elements 3 included in the infrared detection element array 1, and to process an output signal from each infrared detection element 3, to output an image signal (image information) to a monitor, for example. The above-described infrared detection element array 1 and the readout circuit chip 5 are installed in a cold shield provided in a vacuum vessel having a window where infrared ray may enter, and are cooled by a cooling system (cooler). In other words, for example, the above-described imaging device also includes the cooling system. In addition, the above-described imaging device also includes, for example, a filter such as a bandpass filter, or an optical system such as a lens.

Figure 1:
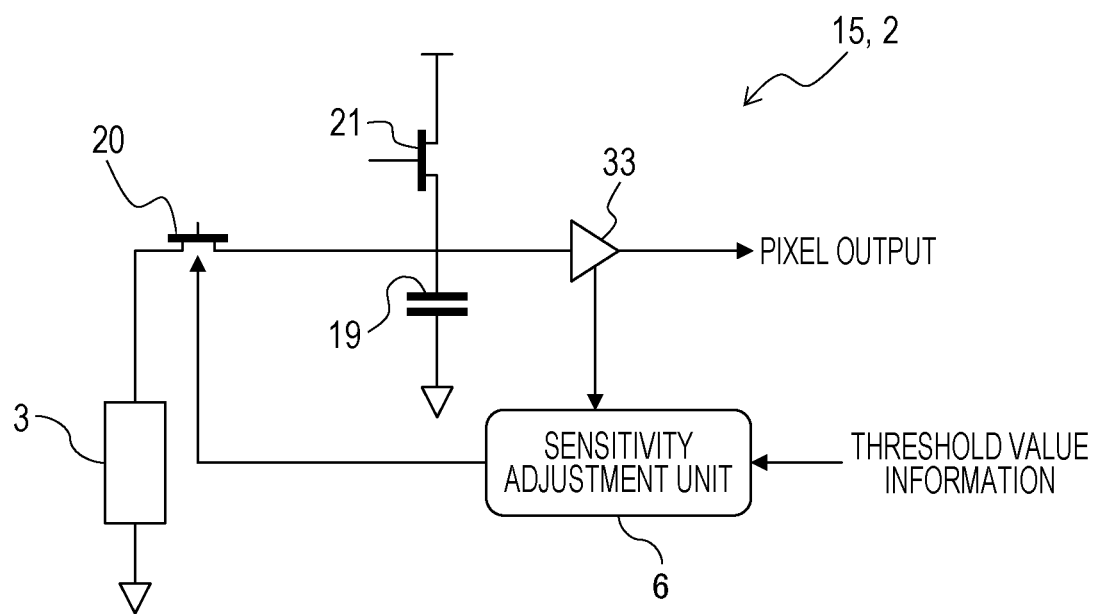
FIG. 1 is a diagram illustrating a configuration of a driving circuit included in a control circuit for an infrared detector according to the embodiment.

In the embodiment, as illustrated in FIG. 1, each of the plurality of the driving circuits 15 that is provided for each pixel includes a sensitivity adjustment unit 6 configured to lower sensitivity of the infrared detection element 3 within a detection time when a value that may be acquired in response to an electric current flowing in the infrared detection element 3 reaches a threshold value within the detection time. The sensitivity adjustment unit 6 is also referred to as a sensitivity adjustment mechanism.

The detection time is a time in which a detection signal is input to the driving circuit 15, and the electric current flowing in the infrared detection element 3 is detected in the detection time. For example, in a case where an integral signal is input as the detection signal, the detection time is an integral time. The detection time is included in a frame. In this case, a frame includes the detection time and a readout time. Therefore, when a value acquired in response to an electric current flowing in the infrared detection element 3 for each pixel in one frame (for example, a voltage value of the integral capacitor 19 or an output value of the driving circuit 15 (pixel output)) reaches a certain threshold value, the sensitivity adjustment unit 6 operates so as to lower sensitivity of the infrared detection element 3 for each pixel in the frame.

The sensitivity adjustment unit 6 has a sensitivity adjustment function in which the sensitivity of the infrared detection element 3 is lowered when the value acquired in response to the electric current flowing in the infrared detection element 3 reaches the certain threshold value within the detection time, but in a case where the acquired value does not reach the threshold value within the detection time, the sensitivity adjustment is not performed in which the sensitivity of the infrared detection element 3 is lowered. In this case, the control method for the infrared detector 1 includes determining whether the value acquired in response to the electric current flowing in the infrared detection element 3 reaches the threshold value within the detection time, by using each of the plurality of driving circuits 15 included in the control circuit 2, and lowering the sensitivity of the infrared detection element 3 in the detection time, in a case where each of the plurality of driving circuits 15 determines that the acquired value reaches the threshold value.

In a case where the output value of the driving circuit 15 (pixel output) reaches an output threshold value as the threshold value within the detection time, the sensitivity adjustment unit 6 lowers the sensitivity of the infrared detection element 3 in the detection time. For example, in a case where the output value of the output amplifier 33 provided in the driving circuit 15 (pixel output) exceeds a threshold value given from the outside (threshold value information) within the detection time, the sensitivity adjustment unit 6 changes a driving condition of the driving circuit 15 (here, a driving condition of a transistor 20 for driving voltage adjustment), and lowers the sensitivity of the infrared detection element 3.

Figure 2A:
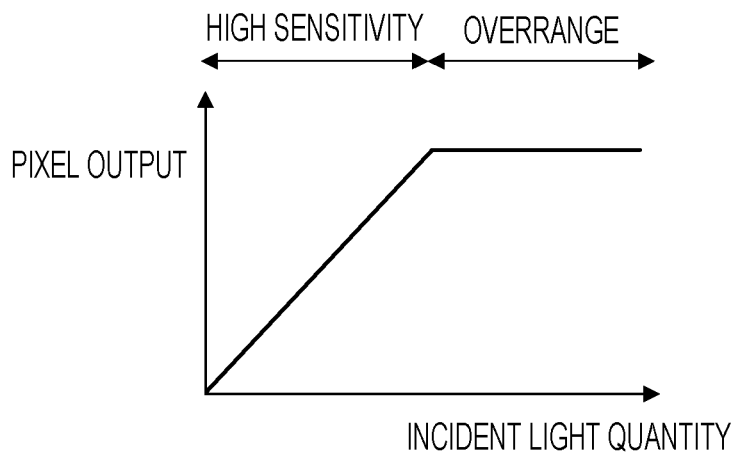
FIG. 2A is a diagram for describing problems of known devices.

Thus, since the driving circuit 15 provided for each pixel is changed so as to include the sensitivity adjustment unit 6, a dynamic range of each infrared detection element 3 may be expanded (extended). In other words, for example, in the known case where the sensitivity adjustment unit is not provided, when the infrared detection element 3 is set to high sensitivity, and is used, the relation between an incident light quantity and a pixel output is, for example, as illustrated in FIG. 2A, and in a case where the incident light quantity exceeds a certain light quantity, the pixel output is saturated, and due to occurrence of a region where over-range occurs, information may not be acquired in the region.

Figure 2B:
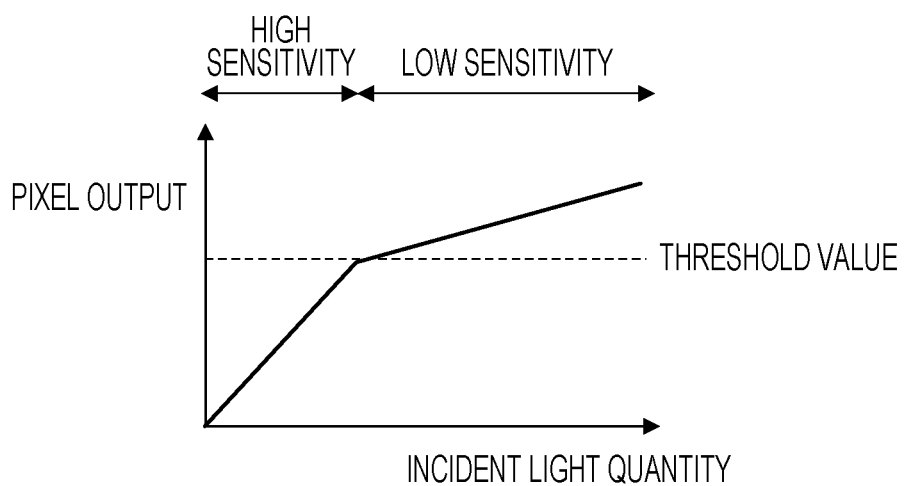
FIG. 2B is a diagram for describing a principle and an effect of the embodiment.
Figure 3:
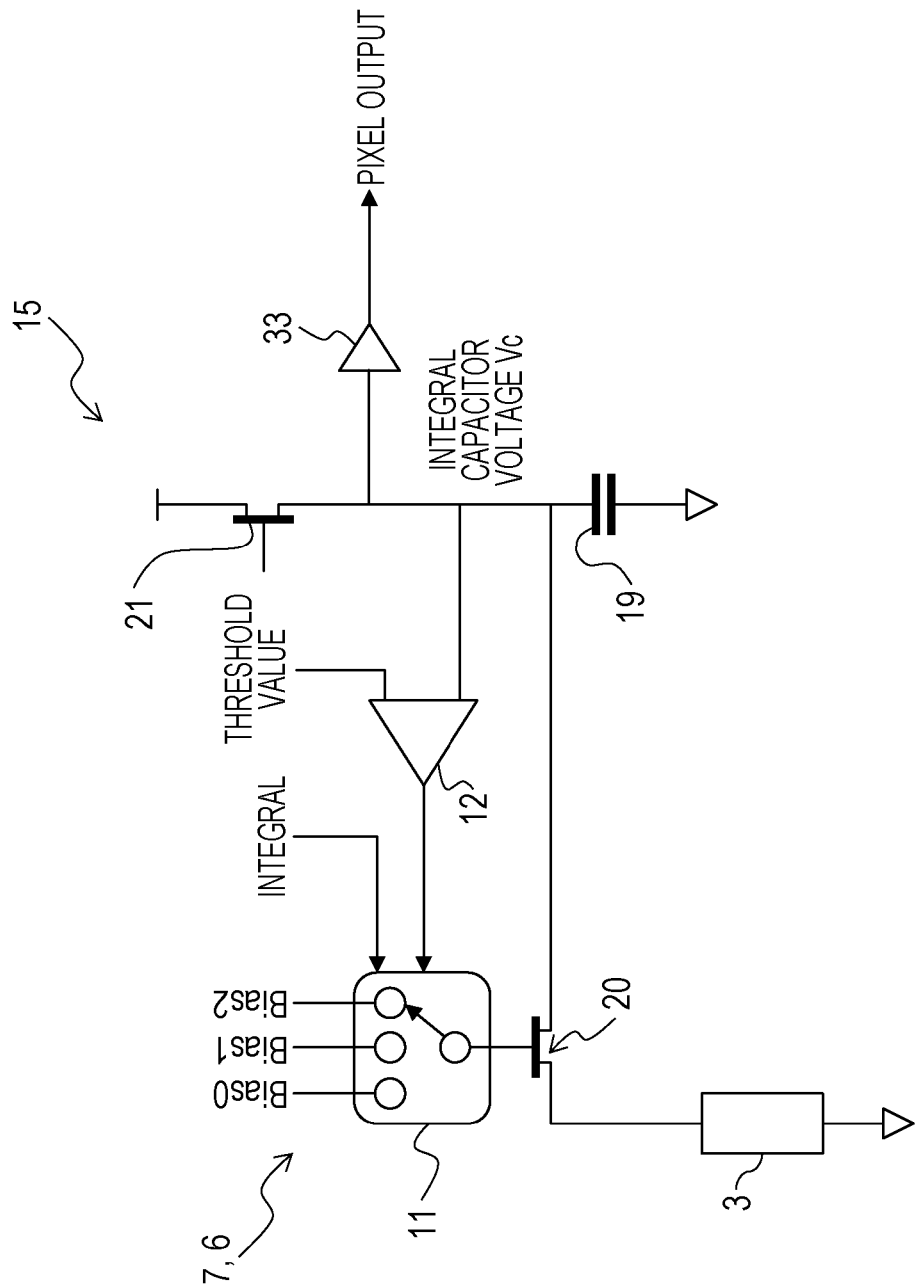
FIG. 3 is a diagram illustrating a configuration of a driving circuit for implementing a first sensitivity adjustment method in the control circuit for the infrared detector according to the embodiment.

On the other hand, as described above, due to the change in which the sensitivity adjustment unit 6 is provided, even in the case where the infrared detection element 3 is set to the high sensitivity, and is used, when the pixel output reaches a predetermined threshold value (here, exceeds the threshold value), the sensitivity of the infrared detection element 3 is lowered, and it means that the setting of the infrared detection element 3 is changed to low sensitivity. Accordingly, the relation between the incident light quantity and the pixel output is, for example, is as illustrated in FIG. 2B, the pixel output may output in a wider range of incident light quantity, compared with the known case where the sensitivity adjustment unit is not provided, and thus the dynamic range of each infrared detection element 3 may be expanded.

That is, for example, occurrence of the region where over-range occurs in the known case may be reduced, and thus even in the region where the information may not be acquired in the known case, the information may be acquired. Other than that, in a case where each of the plurality of the driving circuits 15 is provided with the integral capacitor 19, when a voltage value of the integral capacitor 19 reaches a voltage threshold value as the threshold value within an integral time as the detection time, the sensitivity adjustment unit 6 may lower the sensitivity of the infrared detection element 3 in the integral time (for example, refer to FIG. 3, FIG. 6, and FIG. 8).

For example, in a case where the voltage value of the integral capacitor 19 decreases below a threshold value given from the outside within the integral time as the detection time, the sensitivity adjustment unit 6 may be configured to change the driving condition of the driving circuit 15 (here, the driving condition of the transistor 20 for driving voltage adjustment), and to lower the sensitivity of the infrared detection element 3. The sensitivity adjustment unit 6 may be a driving voltage adjustment unit 7 (shown in FIG. 3 as 7, 6) configured to lower the driving voltage of the infrared detection element 3 in order to lower the sensitivity of the infrared detection element 3 (for example, refer to FIG. 3).

This is a sensitivity adjustment method for lowering the sensitivity of the infrared detection element 3 by lowering the driving voltage (bias voltage) of the infrared detection element 3 in reaching the threshold value. The sensitivity adjustment unit 6 may be an area adjustment unit 8 (shown in FIG. 6 as 8, 6) configured to decrease an area of the infrared detection element 3 in order to lower the sensitivity of the infrared detection element 3 (for example, refer to FIG. 5, and FIG. 6). This is a sensitivity adjustment method for lowering the sensitivity of the infrared detection element 3 by decreasing the area of the infrared detection element 3 in reaching the threshold value.

Figure 5:
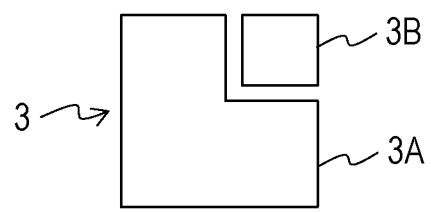
FIG. 5 is a diagram illustrating a configuration of each of pixels for implementing a second sensitivity adjustment method in the control circuit for the infrared detector according to the embodiment.
Figure 6:
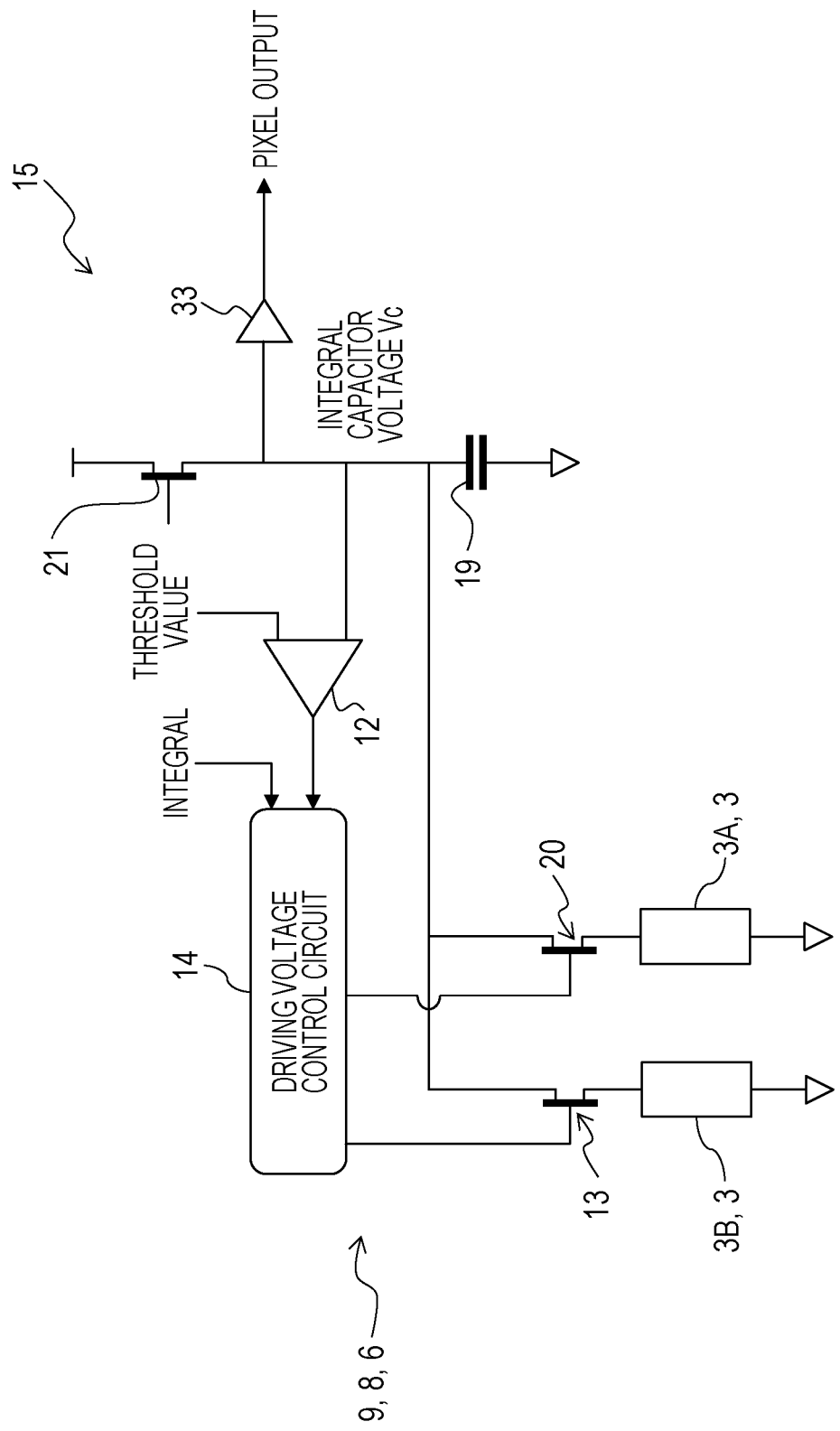
FIG. 6 is a diagram illustrating a configuration of a driving circuit for implementing the second sensitivity adjustment method in the control circuit for the infrared detector according to the embodiment.

In this case, the infrared detection element 3 includes a first region 3A, and a second region 3B (for example, refer to FIG. 5), and the area adjustment unit 8 may be a driving control unit (first driving control unit) 9 (shown in FIG. 6 as 9, 8) configured to drive only one of the first region 3A, and the second region 3B in order to decrease the area of the infrared detection element 3 (for example, refer to FIG. 6). The sensitivity adjustment unit 6 may be a driving control unit (second driving control unit) 10 (shown in FIGS. 8 and 10,6) configured to stop driving of the infrared detection element 3 after a certain period of time elapses since the reach to the threshold value, in order to lower the sensitivity of the infrared detection element 3 (for example, refer to FIG. 8).

This is a sensitivity adjustment method for stopping driving of the infrared detection element 3 after the certain period of time elapses since the reach to the threshold value. Setting the driving voltage (bias voltage) of the infrared detection element 3 to zero may stop driving of the infrared detection element 3. This is a sensitivity adjustment method for shortening an effective integral time, because for example, in a case where the driving circuit 15 includes the integral capacitor 19, after the certain period of time elapses since the reach to the threshold value, the integration (signal integration) is finished.

Stopping driving of the infrared detection element 3, and reducing further change of the value (for example, the voltage value of the integral capacitor 19, or the output value of the driving circuit 15 (pixel output)) acquired in response to an electric current flowing in the infrared detection element 3 after the certain period of time elapses since the reach to the threshold value, may reduce the occurrence of the region where the over-range occurs, and thus information may be acquired in the region where the information has not been acquired.

The reason of the above described adjustment will be described below. Since image sensors (infrared detection elements) that detect infrared ray emitted in response to heat of an object (thermal infrared ray) require no lighting, the imaging sensors have an advantage in detecting a heat source from a long distance, and are effective for detecting victims on the sea or a snow mountain, for example. In such a use case, in order to detect a heat source, such as the human body, that is an object of the detection from a background in low temperature, it is effective that sensitivity of a camera for infrared ray (infrared camera (imaging device)) is set to an value appropriate for the background in the low temperature, and the camera is operated in a high sensitivity state.

In such a case of operation, since the infrared ray from the heat source, such as the human body, that is the object of the detection is larger than that from the background in low temperature, over-range occurs in a pixel portion where the detected heat source is captured as an image by using a camera operating with high sensitivity, and thus only an outline of the detected heat source may be visible in the captured image. In this case, in order to check whether the detected heat source is the object of the detection or not, it is required that the sensitivity of the camera is once lowered, and that the heat source is captured again. Information other than the outline of the heat source (for example, tones) may be preferably acquired without changing the sensitivity.

Therefore, as described above, by providing the sensitivity adjustment unit 6 in the driving circuit 15 provided for each pixel, each pixel of the image sensor in the infrared camera has functions of monitoring light quantity of incident infrared ray (incident light quantity (infrared ray amount)), and lowering sensitivity for each pixel when the incident light quantity reaches a certain value (threshold value). In this case, in order to effectively detect the object (target to be imaged) with high temperature from the background in low temperature, the threshold value may be preferably set so that an incident light quantity range in which the infrared detection element 3 is operated with high sensitivity is maximally expanded.

For example, in a case where the object to be detected having high temperature is the human body, the threshold value may be set so that the minimum number of tones (for example, 16 tones) capable of detecting the human body from an infrared image is assigned to the pixel output range (for example, the output value range of the driving circuit, or the voltage value range of the integral capacitor) for the incident light quantity range corresponding to a reasonable temperature range that a surface of the human body possibly has (for example, from room temperature to around 40° C.).

For example, in a case where the pixel output has 256 tones, the threshold value may be set so that 16 tones of them are assigned to the incident light quantity range corresponding to a range from the room temperature to around 40° C. Accordingly, in a case where the infrared detection element 3 is operated with low sensitivity, the tones may be acquired so as to determine the human body from the infrared image while the incident light quantity range in which the infrared detection element 3 operated with high sensitivity is maximally expanded.

A specific example of sensitivity adjustment by the sensitivity adjustment unit 6 will be described below. An example will be described in which in the case where the voltage value of the integral capacitor 19 decreases below the threshold value (a certain value) during integral time in each pixel, the sensitivity adjustment for lowering the sensitivity is performed by performing any of the following three types of methods. First, the first sensitivity adjustment method is a method in which the sensitivity of each pixel is lowered by lowering the driving voltage of the infrared detection element 3 configuring each pixel.

For example, in the infrared detection element 3, such as QWIP, or QDIP, the sensitivity of each pixel may be lowered by lowering a voltage (driving voltage (bias voltage)) to be applied to the infrared detection element 3. Next, the second sensitivity adjustment method is a method in which the sensitivity of each pixel may be lowered by decreasing the area (light receiving area) of the infrared detection element 3 configuring each pixel. For example, the sensitivity of each pixel may be lowered by dividing the infrared detection element 3 into two regions 3A and 3B, and switching from a state in which the infrared detection is performed using both of the regions 3A and 3B, to a state in which the infrared detection is performed using one of the regions.

Next, the third sensitivity adjustment method is a method in which the sensitivity of each pixel may be lowered by shortening the detection time, namely the integral time, by the infrared detection element 3 configuring each pixel. For example, in a case where the voltage value of the integral capacitor 19 does not decrease below the threshold value during an original integral time determined by an integral signal from the outside in each pixel, the electric current flowing in the infrared detection element 3 is integrated until the original integral time ends.

On the other hand, in a case where the voltage value of the integral capacitor 19 decreases below the threshold value, the sensitivity of each pixel may be lowered by finishing the integration in a shorter time than the original integral time. Specifically, when the voltage value of the integral capacitor 19 decreases below the threshold value during the original integral time, the integration may be finished by operating a timer, and performing additional integration only in certain short time after the voltage value has decreased below the threshold value.

In any of these three sensitivity adjustment methods, in the case where the voltage value of the integral capacitor 19 does not decrease below the threshold value during the integral time in each pixel, the infrared detection (imaging) is performed with high sensitivity, and in the case where the voltage value of the integral capacitor 19 decreases below the threshold value, the infrared detection (imaging) is additionally performed with low sensitivity. Although the output from each pixel becomes non-linear with respect to the incident light quantity, a one-to-one relation is not loosed.

As for the above-described first, second, and third sensitivity adjustment methods, specific configuration examples will be sequentially described below. First, in a case where the sensitivity adjustment is performed by the first sensitivity adjustment method, for example, as illustrated FIG. 3, the sensitivity adjustment unit 6 may be configured by adding an analog switch 11 and a comparator 12 to the driving circuit 15 provided for each pixel.

In this case, the transistor 20 for driving voltage adjustment (for example, MOS transistor) provided in each driving circuit 15 is configured to adjust the bias voltage to be applied to the infrared detection element 3 with a voltage applied to the gate. Therefore, the analog switch 11 is coupled to the gate of the transistor 20 for driving voltage adjustment, and the analog switch 11 is capable of selecting the three bias voltages (Bias0, Bias1, Bias2) as a voltage to be applied to the gate.

The three bias voltages to be given to the analog switch 11 are, for example, set to Bias0=0 V, and Bias1<Bias2, and when Bias2 is given, the infrared detection element 3 may operate with predetermined high sensitivity, and when Bias1 is given, the infrared detection element 3 may operate with predetermined low sensitivity. In this case, the integral signal from the outside is input to the analog switch 11, and when the integral signal is input (integral signal is turned on), the output of the analog switch 11 may be switched from Bias0 to Bias2.

When the integral signal is not input (the integral signal is turned off), the analog switch 11 may be switched to switch the output from Bias2 or Bias1 to Bias0. The comparator 12 is coupled to the integral capacitor 19 provided in each driving circuit 15, and in a case where a voltage value Vc of the integral capacitor 19 decreases below a threshold value given in advance from the outside, the analog switch 11 is switched in response to an output from the comparator 12, the output of the analog switch 11 may be switched from Bias2 to Bias1, and the infrared detection element 3 may operate with low sensitivity.

Accordingly, in the case where the sensitivity adjustment is performed by the first sensitivity adjustment method, the sensitivity adjustment unit 6 is configured by adding the analog switch 11 and the comparator 12 to the driving circuit 15 provided for each pixel. The sensitivity adjustment unit 6 is the driving voltage adjustment unit 7 configured to lower the driving voltage of the infrared detection element 3 in order to lower the sensitivity of the infrared detection element 3.

Figure 4:
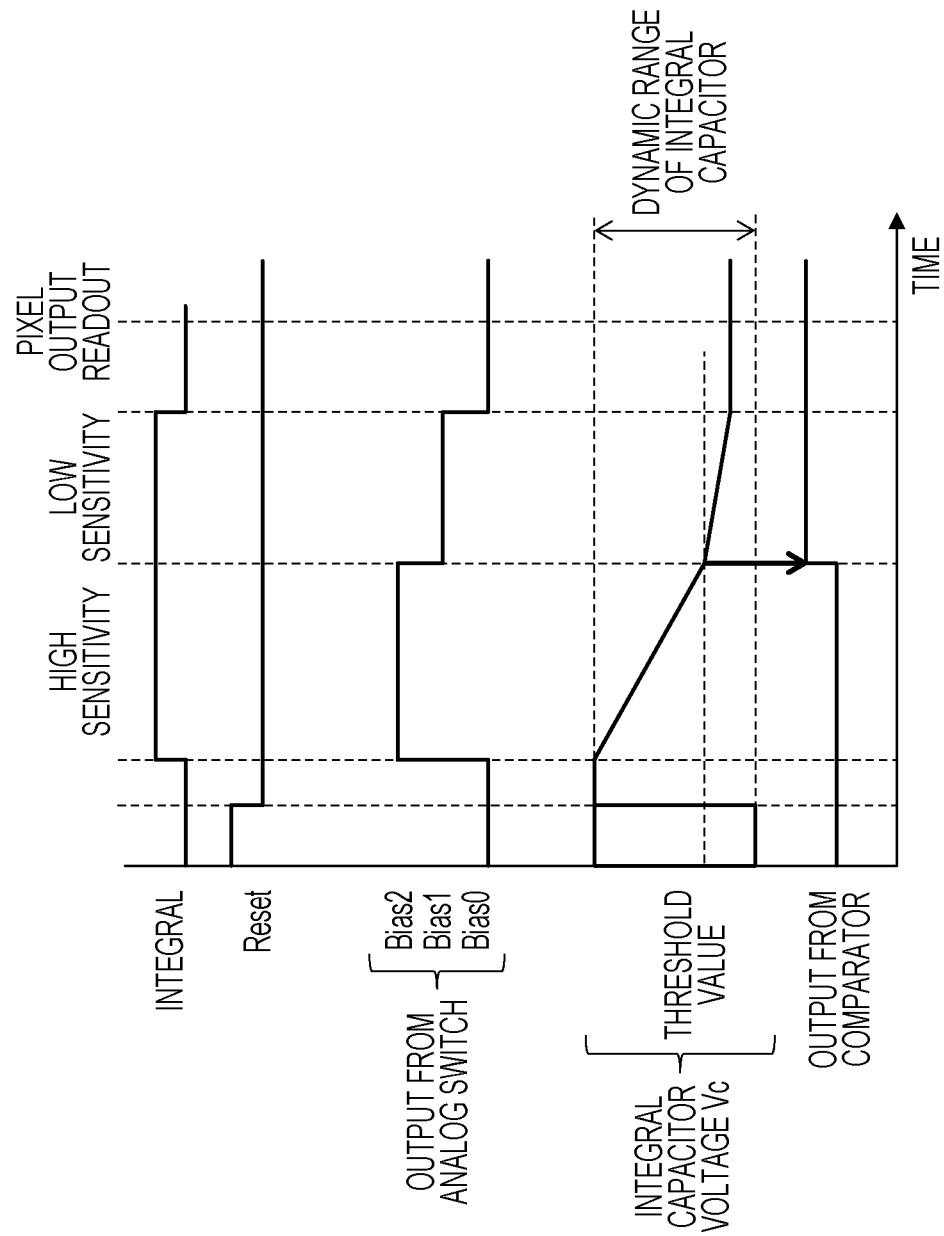
FIG. 4 is a diagram illustrating a timing chart of the first sensitivity adjustment method implemented in the control circuit for the infrared detector according to the embodiment.

An operation may be performed as a timing chart illustrated in FIG. 4 with a reset signal, an integral signal, and a threshold value given from the outside. The timing chart illustrated in FIG. 4 is an operation timing chart, in a case where strong light is incident on a pixel. As illustrated in the timing chart in FIG. 4, the integral capacitor 19 is charged to a certain voltage by inputting the reset signal, the analog switch 11 is switched by inputting the integral signal, and the bias voltage Bias2 is applied to the infrared detection element 3 by switching the output of the analog switch 11 from Bias0 to Bias2. Accordingly, the infrared detection element 3 may operate with high sensitivity.

When infrared ray is incident on the infrared detection element 3, an electric current flows from the integral capacitor 19 in response to the incident light quantity (infrared ray amount), and the voltage value Vc of the integral capacitor 19 gradually decreases. The voltage value of the integral capacitor 19 is continually monitored by the comparator 12, and in a case where the voltage value of the integral capacitor 19 decreases below the threshold value given in advance from the outside, the analog switch 11 is switched in response to the output from the comparator 12, the output of the analog switch 11 is switched from Bias2 to Bias1, and the sensitivity of the infrared detection element 3 is lowered.

That is, for example, when the voltage value Vc of the integral capacitor 19 decreases below the threshold value within the integral time, the infrared detection element 3 operates with low sensitivity from the time of the decrease below the threshold value to the end of the integral time. On the other hand, in a case where the voltage value Vc of the integral capacitor 19 does not decrease below the threshold value, the analog switch 11 is not switched, and remains to be Bias2, and the infrared detection element 3 continues to operate with high sensitivity.

That is, for example, in the case where the voltage value Vc of the integral capacitor 19 does not decrease below the threshold value, the infrared detection element 3 operates with high sensitivity during the whole integral time. Since the determination of whether the voltage value of the integral capacitor 19 decreases below the threshold value or not is performed for each pixel, whether the infrared detection element 3 continues to operate with high sensitivity, or is switched from high sensitivity to low sensitivity and then operates, is determined for each pixel.

At a point of time when the integral signal from the outside changes, that is, when the integral signal is switched from on to off, the analog switch 11 is switched from Bias1 or Bias2 to Bias0, the integration is finished, and then, after the pixel output of each pixel is read from the outside by a certain sequence, a reset signal is input again and the integration of the next frame starts. With the above operation, for each pixel, the operation is performed with high sensitivity until the voltage value Vc of the integral capacitor 19 in response to the incident light quantity reaches the threshold value, and when the voltage value Vc reaches the threshold value, the operation is performed with low sensitivity. The pixel output after the operation like this may be acquired for each pixel, and the pixel output of each pixel acquired in this way may be acquired for each frame.

Next, in the case where the sensitivity adjustment is performed by the second sensitivity adjustment method, for example, as illustrated in FIG. 5, the sensitivity of each pixel may be lowered by dividing the infrared detection element 3 into the two regions (the first region 3A and the second region 3B), and switching from a state in which the infrared detection is performed using both of the regions, to a state in which the infrared detection is performed using one of the regions.

In this case, in the driving circuit 15 provided for each pixel, it is simply required that the transistor 20 for driving voltage adjustment be added, one more transistor 13 for driving voltage adjustment be provided, one of the transistors be coupled to the first region 3A of the infrared detection element 3, and the other be coupled to the second region 3B of the infrared detection element 3. The transistor 20 for driving voltage adjustment coupled to the first region 3A of the infrared detection element 3 is also referred to as a transistor for first driving voltage adjustment. The transistor 13 for driving voltage adjustment coupled to the second region 3B of the infrared detection element 3 is also referred to as a transistor for second driving voltage adjustment.

It is simply required that a driving voltage control circuit 14 be coupled to these transistor 20 for the first driving voltage adjustment and transistor 13 for the second driving voltage adjustment, and the transistor 20 for the first driving voltage adjustment and the transistor 13 for the second driving voltage adjustment operate in response to an output from the driving voltage control circuit 14. In this case, an integral signal from the outside may be input to the driving voltage control circuit 14, and when the integral signal is input (the integral signal is turned on), the transistor 20 for the first driving voltage adjustment and the transistor 13 for the second driving voltage adjustment may operate in response to the output from the driving voltage control circuit 14, and the infrared detection may be performed with high sensitivity by using both the first region 3A and the second region 3B of the infrared detection element 3.

When the integral signal is not input (the integral signal is turned off), the output from the driving voltage control circuit 14 may be switched, and the transistor 20 for the first driving voltage adjustment and the transistor 13 for the second driving voltage adjustment may stop the operation (driving). The comparator 12 may be coupled to the integral capacitor 19 provided in each driving circuit 15, and in the case where the voltage value Vc of the integral capacitor 19 decreases below the threshold value given in advance from the outside, the output from the driving voltage control circuit 14 may be switched in response to the output from the comparator 12, only one of the transistor 20 for the first driving voltage adjustment and the transistor 13 for the second driving voltage adjustment (here, the transistor 13 for the second driving voltage adjustment) may operate (drive), switching may be performed so that the infrared detection is performed by using only one of the first region 3A and the second region 3B of the infrared detection element 3 (here, the second region 3B), and the infrared detection element 3 may operate with low sensitivity.

Accordingly, in the case where the sensitivity adjustment is performed by the second sensitivity adjustment method, the sensitivity adjustment unit 6 is configured by adding one more transistor 13 for driving voltage adjustment, the driving voltage control circuit 14, and the comparator 12 to the driving circuit 15 provided for each pixel. The sensitivity adjustment unit 6 is the area adjustment unit 8 configured to decrease an area of the infrared detection element 3 in order to lower the sensitivity of the infrared detection element 3.

The area adjustment unit 8 is the driving control unit (first driving control unit) 9 configured to drive only one of the first region 3A, and the second region 3B in order to decrease the area of the infrared detection element 3. An operation may be performed as a timing chart illustrated in FIG. 7 with a reset signal, an integral signal, and a threshold value given from the outside. The timing chart illustrated in FIG. 7 is an operation timing chart, in a case where strong light is incident on a pixel.

Figure 7:
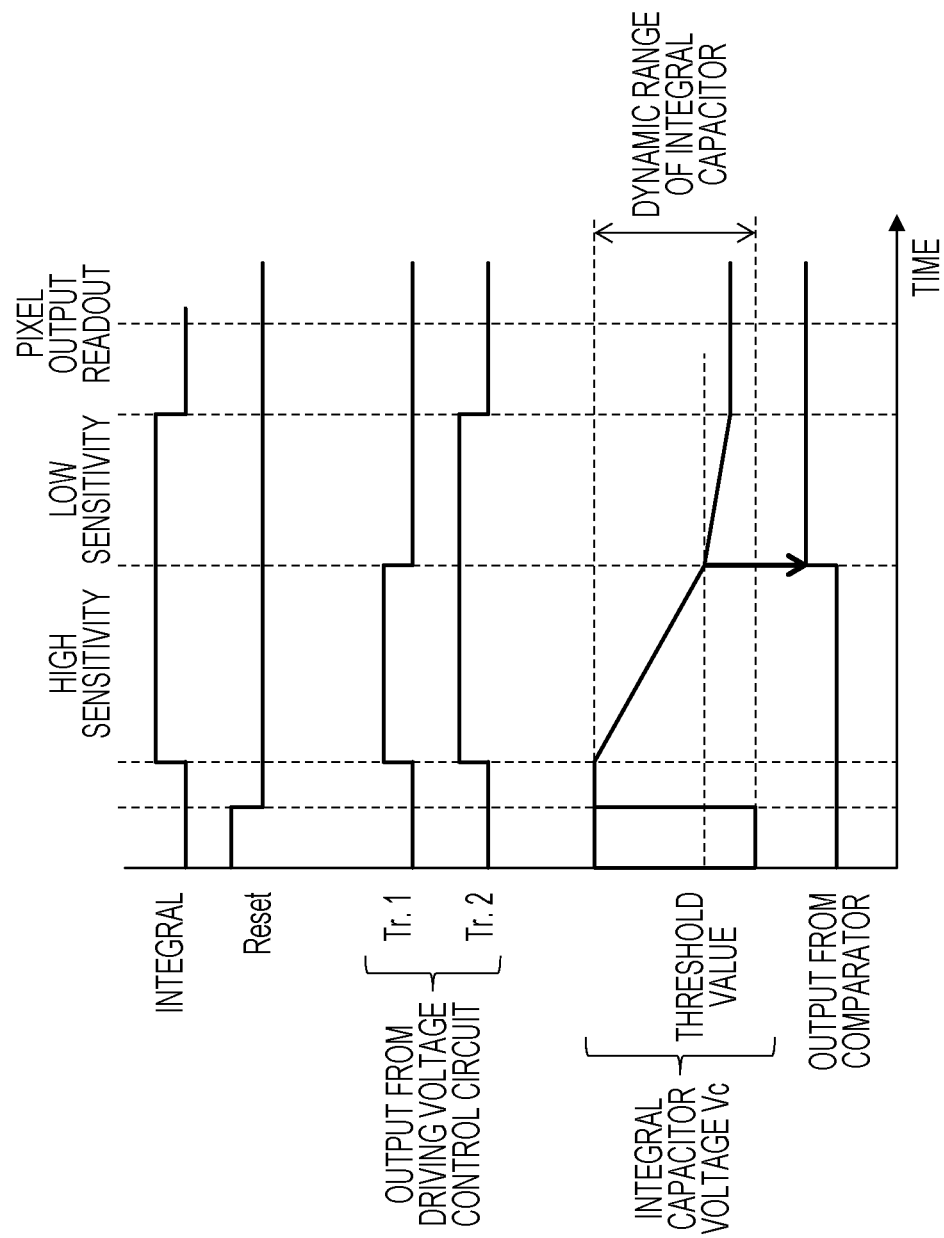
FIG. 7 is a diagram illustrating a timing chart of the second sensitivity adjustment method implemented in the control circuit for the infrared detector according to the embodiment.

As illustrated in the timing chart in FIG. 7, the integral capacitor 19 is charged to a certain voltage by inputting the reset signal, the output of the driving voltage control circuit 14 is switched by inputting the integral signal, the transistor 20 for the first driving voltage adjustment and the transistor 13 for the second driving voltage adjustment operate, and the bias voltage is applied to both the first region 3A and the second region 3B of the infrared detection element 3.

Accordingly, the operation is performed with high sensitivity by using both the first region 3A and the second region 3B of the infrared detection element 3. When infrared ray is incident on the infrared detection element 3, an electric current flows from the integral capacitor 19 in response to the incident light quantity (infrared ray amount), and the voltage value Vc of the integral capacitor 19 gradually decreases. The voltage value Vc of the integral capacitor 19 is continually monitored by the comparator 12, and in a case where the voltage value Vc of the integral capacitor 19 decreases below the threshold value given in advance from the outside, the output of the driving voltage control circuit 14 is switched in response to the output from the comparator 12, only one of the transistor 20 for the first driving voltage adjustment and the transistor 13 for the second driving voltage adjustment (here, the transistor 13 for the second driving voltage adjustment) operates, and the bias voltage is applied to only one of the first region 3A and the second region 3B (here, the second region 3B) of the infrared detection element 3.

Therefore, when the voltage value Vc of the integral capacitor 19 decreases below the threshold value within the integral time, one of the first region 3A and the second region 3B of the infrared detection element 3 (here, the second region 3B) is used and operates with low sensitivity from the time of the decrease below the threshold value to the end of the integral time. On the other hand, in the case where the voltage value Vc of the integral capacitor 19 does not decrease below the threshold value, the output of the driving voltage control circuit 14 is not switched, and both the first region 3A and the second region 3B of the infrared detection element 3 are used and continue to operate with high sensitivity.

That is, for example, in the case where the voltage value Vc of the integral capacitor 19 does not decrease below the threshold value, both the first region 3A and the second region 3B of the infrared detection element 3 operate with high sensitivity during the whole integral time. Since the determination of whether the voltage value Vc of the integral capacitor 19 decreases below the threshold value or not is performed for each pixel, whether the infrared detection element 3 continues to operate with high sensitivity, or is switched from high sensitivity to low sensitivity and then operates, is determined for each pixel.

At a point of time when the integral signal from the outside changes, that is, when the integral signal is switched from on to off, the output of the driving voltage control circuit 14 is switched, the transistor 20 for the first driving voltage adjustment and the transistor 13 for the second driving voltage adjustment stop the operation, the integration is finished, and then, after the pixel output of each pixel is read from the outside by a certain sequence, a reset signal is input again and the integration of the next frame starts.

With the above operation, for each pixel, the operation is performed with high sensitivity until the voltage value Vc of the integral capacitor 19 in response to the incident light quantity reaches the threshold value, and when the voltage value Vc reaches the threshold value, the operation is performed with low sensitivity. The pixel output after the operation like this may be acquired for each pixel, and the pixel output of each pixel acquired in this way may be acquired for each frame. In a case where the sensitivity adjustment unit 6 is configured in this way, for example, this sensitivity adjustment method may be used for the infrared detection element 3 in which the driving voltage is not usable for adjusting the sensitivity.

Figure 8:
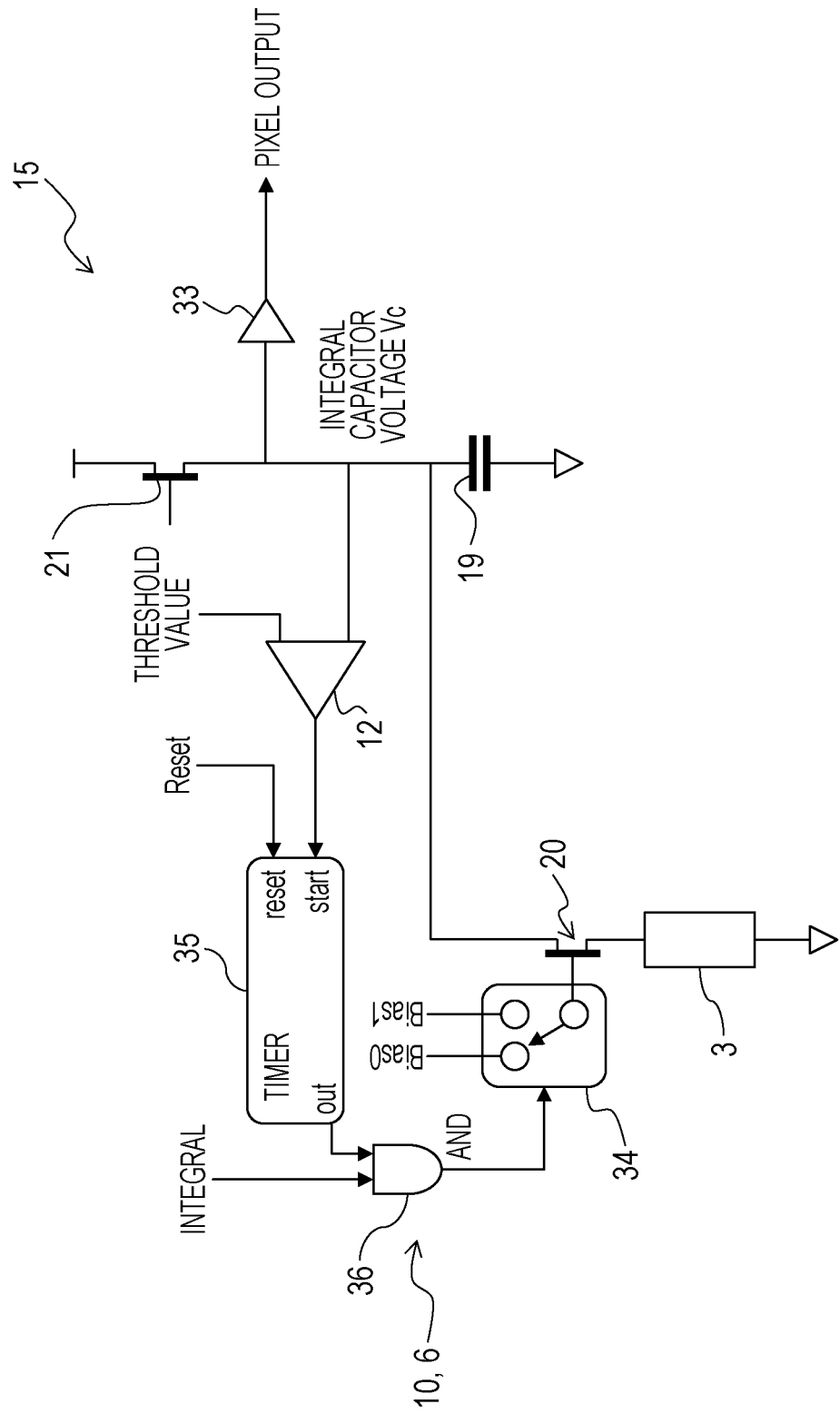
FIG. 8 is a diagram illustrating a configuration of a driving circuit for implementing a third sensitivity adjustment method in the control circuit for the infrared detector according to the embodiment.

Next, in a case where the sensitivity adjustment is performed by the third sensitivity adjustment method, for example, as illustrated FIG. 8, the sensitivity adjustment unit 6 may be configured by adding an analog switch 34, a timer 35, an AND circuit 36 and the comparator 12 to the driving circuit 15 provided for each pixel. In this case, the transistor 20 for driving voltage adjustment (for example, MOS transistor) provided in each driving circuit 15 is configured to adjust the bias voltage to be applied to the infrared detection element 3 with a voltage applied to the gate.

Therefore, the analog switch 34 is coupled to the gate of the transistor 20 for driving voltage adjustment, and the analog switch 34 is capable of selecting two bias voltages (Bias0, Bias1) as a voltage to be applied to the gate. The two bias voltages to be given to the analog switch 34 are, for example, set to Bias0=0 V, and Bias0<Bias1, and when Bias1 is given, the infrared detection element 3 may operate with predetermined high sensitivity.

In this case, an integral signal from the outside may be input to the AND circuit 36, and an output from "out" of the timer 35 may further be input to the AND circuit 36. A reset signal may be input to "reset" of the timer 35. When the reset signal is input to "reset", "out" of the timer 35 may become "High".

In a state where an output from "out" of the timer 35 is "High", and the output "High" is input to the AND circuit 36, when the integral signal is input to the AND circuit 36 (the integral signal is turned on), an AND condition may be established, the analog switch 34 may be switched, and the output of the analog switch 34 may be switched from Bias0 to Bias1. When the integral signal is not input (the integral signal is turned off), the AND condition may not be established, and the output of the analog switch 34 may be switched from Bias1 to Bias0.

The comparator 12 may be coupled to the integral capacitor 19 provided in each driving circuit 15, and in a case where the voltage value Vc of the integral capacitor 19 decreases below the threshold value given in advance from the outside, the output from the comparator 12 may be input to "start" of the timer 35, "out" of the timer 35 may become "Low" after a certain period of time elapses since the input, the output "Low" may be input to the AND circuit 36, the AND condition may not be established, the output of the analog switch 34 may be switched from Bias1 to Bias0, and the infrared detection element 3 may stop the operation (driving).

That is, for example, in the case where the voltage value Vc of the integral capacitor 19 decreases below the threshold value given in advance from the outside, stopping the operation (driving) of the infrared detection element 3 after the certain period of time elapses since the reach to the threshold value, may lead to shorten an effective integral time to lower the sensitivity of each pixel. In this situation, in each pixel, in the case where the voltage value Vc of the integral capacitor 19 does not decrease below the threshold value during an original integral time determined by an integral signal from the outside, an electric current flowing in the infrared detection element 3 is integrated until the original integral time ends.

On the other hand, in a case where the voltage value Vc of the integral capacitor 19 decreases below the threshold value, by forcibly finishing the integration in a shorter time than the original integral time, namely, when the certain period of time elapses after the voltage value Vc has decreased below the threshold value, the effective integral time is shortened, and thus the sensitivity of each pixel may be effectively lowered. Accordingly, in the case where the sensitivity adjustment is performed by the third sensitivity adjustment method, the sensitivity adjustment unit 6 is configured by adding the analog switch 34, the AND circuit 36, the timer 35, and the comparator 12 to the driving circuit 15 provided for each pixel.

The sensitivity adjustment unit 6 is the driving control unit (second driving control unit) 10 configured to stop driving of the infrared detection element 3 after a certain period of time elapses since the reach to the threshold value, in order to lower the sensitivity of the infrared detection element 3. An operation may be performed as a timing chart illustrated in FIG. 9 with a reset signal, an integral signal, and a threshold value given from the outside.

Figure 9:
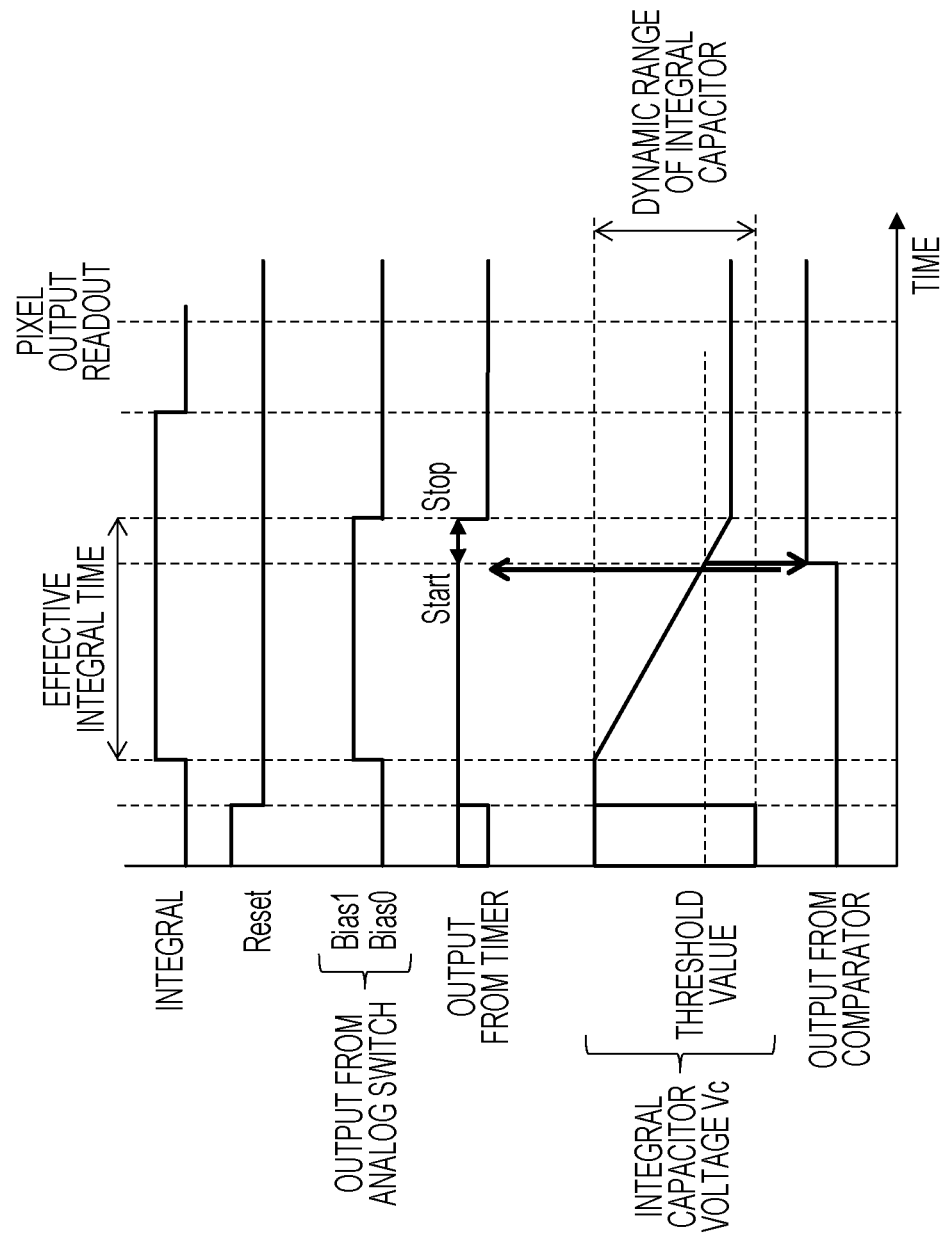
FIG. 9 is a diagram illustrating a timing chart of the third sensitivity adjustment method implemented in the control circuit for the infrared detector according to the embodiment.
Figure 10:
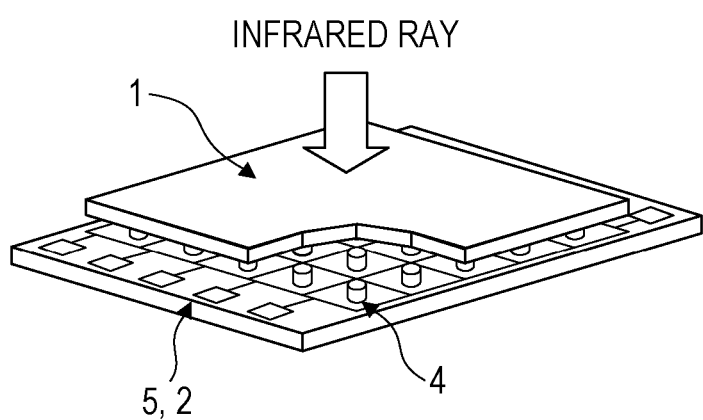
FIG. 10 is a perspective view illustrating a configuration of an imaging device according to the embodiment.

The timing chart illustrated in FIG. 9 is an operation timing chart, in a case where strong light is incident on a pixel. As illustrated in the timing chart in FIG. 9, the integral capacitor 19 is charged to a certain voltage by inputting the reset signal, the analog switch 34 is switched by inputting the integral signal, and the bias voltage Bias1 is applied to the infrared detection element 3 by switching the output of the analog switch 34 from Bias0 to Bias1. Accordingly, the infrared detection element 3 may operate with high sensitivity.

When infrared ray is incident on the infrared detection element 3, an electric current flows from the integral capacitor 19 in response to the incident light quantity (infrared ray amount), and the voltage value Vc of the integral capacitor 19 gradually decreases. The voltage value Vc of the integral capacitor 19 is continually monitored by the comparator 12, and in the case where the voltage value Vc of the integral capacitor 19 decreases below the threshold value given in advance from the outside, the output from the comparator 12 is input to "start" of the timer 35, "out" of the timer 35 becomes "Low" after a certain period of time elapses since the input, the output "Low" is input to the AND circuit 36, the AND condition is not established, the output of the analog switch 34 may be switched from Bias1 to Bias0, and the infrared detection element 3 stops the operation (driving).

That is, when the voltage value Vc of the integral capacitor 19 decreases below the threshold value within the integral time, the infrared detection element 3 forcibly finishes the integration after a predetermined period of time elapses since the time of the decrease below the threshold value, the effective integral time is shortened, and thus the sensitivity of each pixel may be effectively lowered. Therefore, stopping the operation (driving) of the infrared detection element 3 means that the sensitivity of each pixel is switched from high sensitivity to low sensitivity, and then the operation is performed.

On the other hand, in a case where the voltage value Vc of the integral capacitor 19 does not decrease below the threshold value, the analog switch 34 is not switched, and remains to be Bias1, and the infrared detection element 3 continues to operate with high sensitivity. That is, for example, in the case where the voltage value Vc of the integral capacitor 19 does not decrease below the threshold value, the infrared detection element 3 operates with high sensitivity during the whole integral time.

Since the determination of whether the voltage value Vc of the integral capacitor 19 decreases below the threshold value or not is performed for each pixel, whether the infrared detection element 3 continues to operate with high sensitivity, or is switched from high sensitivity to low sensitivity and then operates, is determined for each pixel. At a point of time when the integral signal from the outside changes, that is, when the integral signal is switched from on to off, the integration is finished, and then, after the pixel output of each pixel is read from the outside by a certain sequence, a reset signal is input and the integration of the next frame starts.

With the above operation, for each pixel, the operation is performed with high sensitivity until the voltage value Vc of the integral capacitor 19 in response to the incident light quantity reaches the threshold value, and when the voltage value Vc reaches the threshold value, the operation is performed with low sensitivity. The pixel output after the operation like this may be acquired for each pixel, and the pixel output of each pixel acquired in this way may be acquired for each frame. In a case where the sensitivity adjustment unit 6 is configured in this way, this sensitivity adjustment method have a merit for the infrared detection element 3 in which the driving voltage is not usable for changing the sensitivity in that reduction of an effective area associated with the division of the infrared detection element 3 does not occur, compared with the second sensitivity adjustment method in which one pixel is divided into a plurality of regions 3A and 3B.

Therefore, a control circuit and a control method for an infrared detector, and an imaging device according to the embodiment have an effect of expanding a dynamic range of the infrared detection element 3 without sacrificing a frame rate or the number of the infrared detection elements 3 (the number of pixels). That is, for example, the sensitivity of the infrared detection element 3 is switchable for each pixel in the frame, and the dynamic range of the infrared detection element 3 may be expanded without sacrificing a frame rate or the number of imaging elements.

This may be expected to have an effect of significantly improving convenience in an operation of an infrared detection system (imaging device) for detecting a heat source by using infrared ray. Note that the disclosure is not limited to the above-described embodiment and each modification, and various modifications may be made within the scope that does not depart from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control circuit for an infrared detector comprising:
   a plurality of driving circuits configured to be respectively coupled to a plurality of infrared detection elements of the infrared detector,
   each of the plurality of driving circuits is configured to drive a corresponding at least one of the plurality of infrared detection elements,
   wherein each of the plurality of driving circuits includes a sensitivity adjustment circuit configured to lower sensitivity of the corresponding at least one infrared detection element within a detection time, in a case where a value acquired in response to an electric current flowing in the corresponding at least one infrared detection element reaches a threshold value within the detection time.

2. The control circuit for the infrared detector according to claim 1,
   wherein each of the plurality of driving circuits includes an integral capacitor and the detection time is an integral time of the integral capacitor, and
   when a voltage value of the integral capacitor reaches the threshold value within the integral time, the sensitivity adjustment circuit lowers the sensitivity of the corresponding at least one infrared detection element within the integral time.

3. The control circuit for the infrared detector according to claim 1,
   wherein the sensitivity adjustment circuit lowers the sensitivity of the corresponding at least one infrared detection element in the detection time when an output value of the driving circuit reaches the threshold value within the detection time.

4. The control circuit for the infrared detector according to claim 1,
wherein the sensitivity adjustment circuit is a driving voltage adjustment circuit configured to lower a driving voltage of the corresponding at least one infrared detection element, in order to lower the sensitivity of the corresponding at least one infrared detection element.

5. The control circuit for the infrared detector according to claim 1,
wherein the sensitivity adjustment circuit is an area adjustment circuit configured to decrease an area of the corresponding at least one infrared detection element, in order to lower the sensitivity of the corresponding at least one infrared detection element.

6. The control circuit for the infrared detector according to claim 5,
wherein the infrared detection element includes a first region and a second region, and
the area adjustment circuit is a first driving control circuit configured to drive only one of the first region and the second region, in order to decrease the area of the corresponding at least one infrared detection element.

7. The control circuit for the infrared detector according to claim 1,
wherein the sensitivity adjustment circuit is a second driving control circuit configured to stop driving of the corresponding at least one infrared detection element after a certain period of time elapses since detection of the value acquired reaching the threshold value, in order to lower the sensitivity of the corresponding at least one infrared detection element.

8. An imaging device comprising:
an infrared detector including a plurality of infrared detection elements; and
a control circuit configured to control the infrared detector,
wherein the control circuit is coupled to each of a plurality of infrared detection elements, and includes a plurality of driving circuits configured to respectively drive a corresponding at least one of the plurality of infrared detection elements, and
each of the plurality of driving circuits includes a sensitivity adjustment circuit configured to lower sensitivity of the corresponding at least one infrared detection element within a detection time, in a case where a value acquired in response to an electric current flowing in the corresponding at least one infrared detection element reaches a threshold value within the detection time.

9. The imaging device according to claim 8,
wherein each of the plurality of driving circuits includes an integral capacitor and the detection time is an integral time of the integral capacitor, and
when a voltage value of the integral capacitor reaches the threshold value within the integral time, the sensitivity adjustment circuit lowers the sensitivity of the corresponding at least one infrared detection element within the integral time.

10. The imaging device according to claim 8,
wherein the sensitivity adjustment circuit lowers the sensitivity of the corresponding at least one infrared detection element in the detection time when an output value of the driving circuit reaches the threshold value within the detection time.

11. The imaging device according to claim 8,
wherein the sensitivity adjustment circuit is a driving voltage adjustment circuit configured to lower a driving voltage of the corresponding at least one infrared detection element, in order to lower the sensitivity of the corresponding at least one infrared detection element.

12. The imaging device according to claim 8,
wherein the sensitivity adjustment circuit is an area adjustment circuit configured to decrease an area of the corresponding at least one infrared detection element, in order to lower the sensitivity of the corresponding at least one infrared detection element.

13. The imaging device according to claim 12,
wherein the infrared detection element includes a first region and a second region, and
the area adjustment circuit is a first driving control circuit configured to drive only one of the first region and the second region, in order to decrease the area of the corresponding at least one infrared detection element.

14. The imaging device according to claim 8,
wherein the sensitivity adjustment circuit is a second driving control circuit configured to stop driving of the corresponding at least one infrared detection element after a certain period of time elapses since detection of the value acquired reaching the threshold value, in order to lower the sensitivity of the corresponding at least one infrared detection element.

15. A control method of an infrared detector, the method comprising:
monitoring a value acquired in response to an electric current flowing in each of a plurality of infrared detection elements of the infrared detector, and
lowering, when the value acquired in response to the electric current flowing in an infrared detection element reaches a threshold value within a detection time, sensitivity of the infrared detection element within the detection time.

* * * * *